US007823201B1

(12) United States Patent
Xu

(10) Patent No.: US 7,823,201 B1
(45) Date of Patent: Oct. 26, 2010

(54) DETECTION OF KEY LOGGING SOFTWARE

(75) Inventor: Yelie Xu, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 1213 days.

(21) Appl. No.: 11/394,791

(22) Filed: Mar. 31, 2006

(51) Int. Cl.
*G06F 11/20* (2006.01)
*G06F 7/04* (2006.01)

(52) U.S. Cl. .......................... 726/22; 726/26; 713/186; 713/187; 713/188; 717/174

(58) Field of Classification Search ........................ None
See application file for complete search history.

(56) References Cited

U.S. PATENT DOCUMENTS

| 7,467,285 | B2* | 12/2008 | Khosravi et al. ............ 711/206 |
| 2006/0206937 | A1* | 9/2006 | Repasi et al. ................. 726/22 |
| 2007/0094496 | A1* | 4/2007 | Burtscher ..................... 713/164 |
| 2007/0168285 | A1* | 7/2007 | Girtakovskis et al. ......... 705/50 |
| 2007/0245343 | A1* | 10/2007 | Shannon et al. ............. 717/174 |

OTHER PUBLICATIONS

Aslam, M; Idrees, R.N.; Baig, M.M. and Arsahd, A.; "Anti-Hook Shield Against the Software Key Loggers"; National Conference on Emerging Technologies 2004. Lahore, Pakistan.

* cited by examiner

*Primary Examiner*—Nasser Moazzami
*Assistant Examiner*—Fikremariam Yalew
(74) *Attorney, Agent, or Firm*—Beyer Law Group LLP

(57) ABSTRACT

Installing a detection hook function aids in the detection of keylogger software on a computer. A request to install a hook procedure via the system service function is intercepted by the detection hook function. The detection hook function determines whether the request indicates that the hook procedure is keylogger software. If so, an action is taken such as denying the request or alerting the user. A detection hook function also intercepts a request to remove a hook procedure. A dynamic detection function intercepts a call to a hook chain function attempting to pass an event to a hook procedure.

17 Claims, 9 Drawing Sheets

Locate Shadow Service Table

| | |
|---|---|
| WH_CALLWNDPROC | Called when SendMessage is called. |
| WH_CALLWNDPROCRET | Called when SendMessage returns. |
| WH_GETMESSAGE | Called when GetMessage or PeekMessage is called. |
| WH_KEYBOARD | Called when GetMessage or PeekMessage retrieves WM_KEYUP or WM_KEYDOWN from the message queue. |
| WH_MOUSE | Called when GetMessage or PeekMessage retrieves a mouse message from the message queue. |
| WH_HARDWARE | Called when GetMessage or PeekMessage retrieves a hardware message that is not related to keyboard or mouse. |
| WH_MSGFILTER | Called when a dialog box, menu or scrollbar is about to process a message. |
| WH_SYSMSGFILTER | Same as WH_MSGFILTER but system-wide. |
| WH_JOURNALRECORD | Called when the Operating System retrieves a message from the hardware input queue. |
| WH_JOURNALPLAYBACK | Called when an event is requested from the system's hardware input queue. |
| WH_SHELL | Called when something interesting concerning the shell occurs. |
| WH_CBT | Used specifically for computer-based training (CBT). |
| WH_FOREGROUNDIDLE | Used internally by the Operating System. |
| WH_DEBUG | Used to debug the hooking procedure. |

Types of Hooks and How Used

FIG. 1

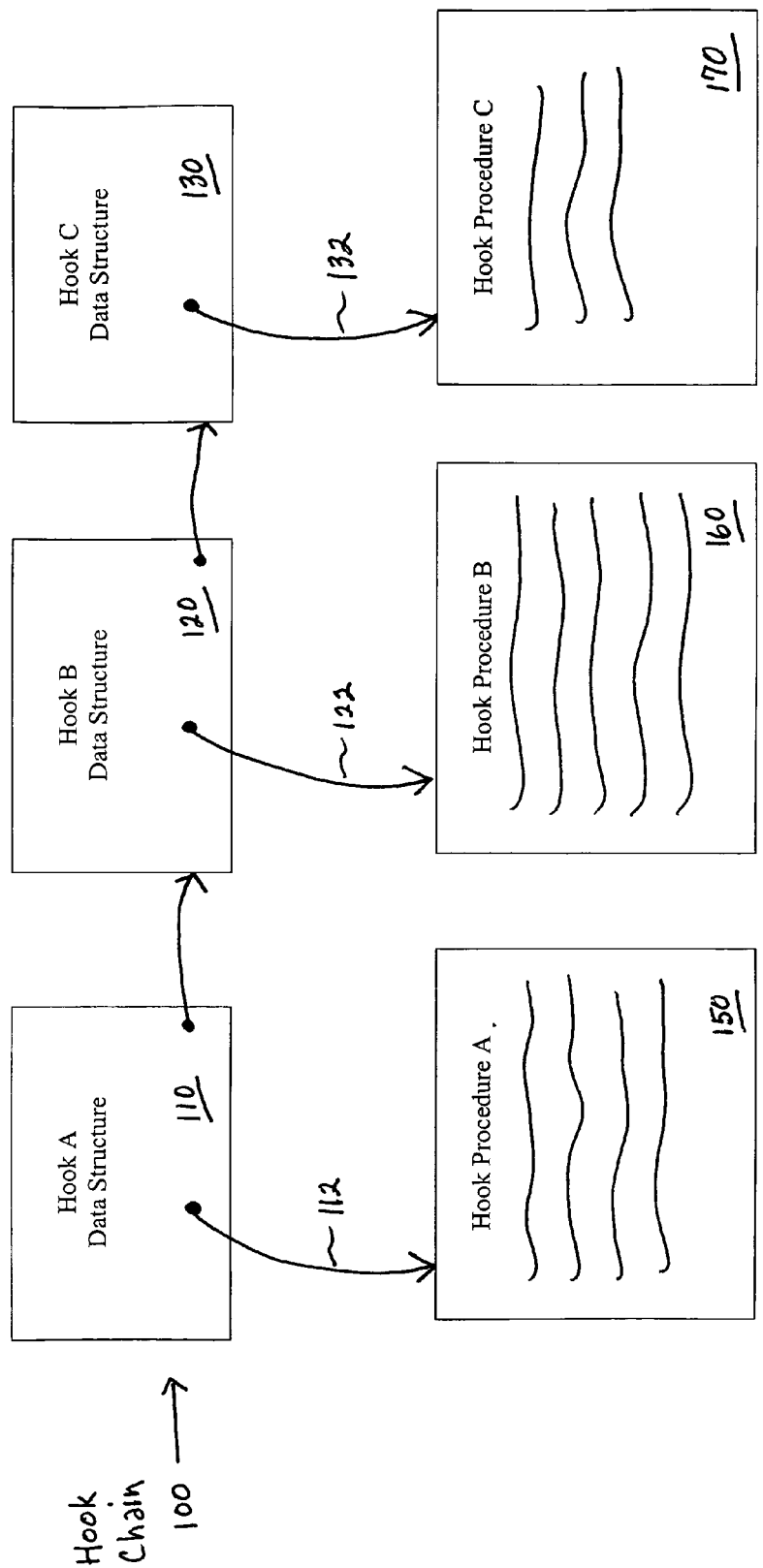
FIG. 2 Hook Procedures in Computer Memory

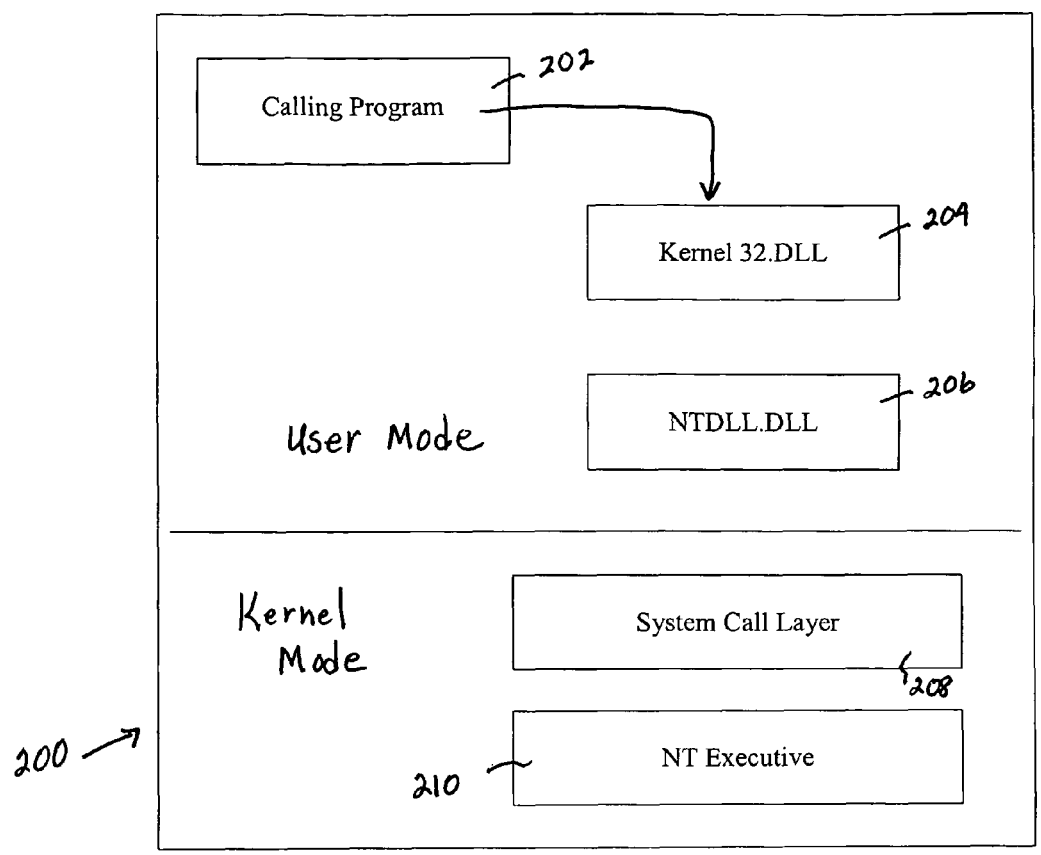
FIG. 3 Invoking a System Service

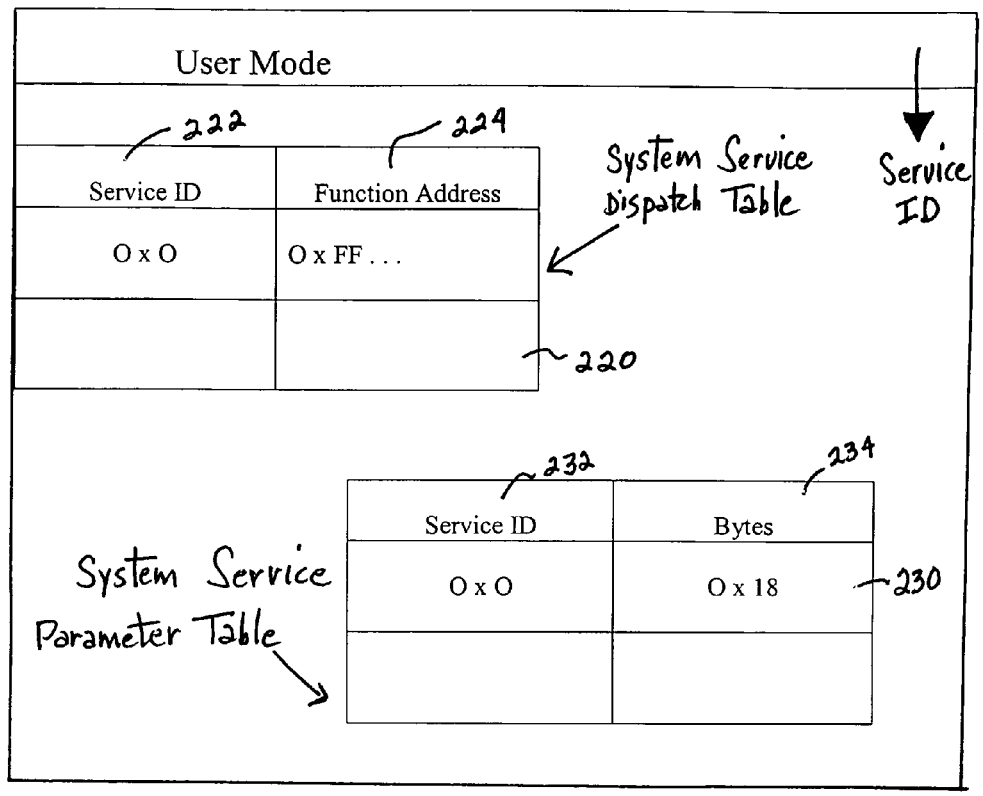
FIG. 4 Dispatch Table and Parameter Table

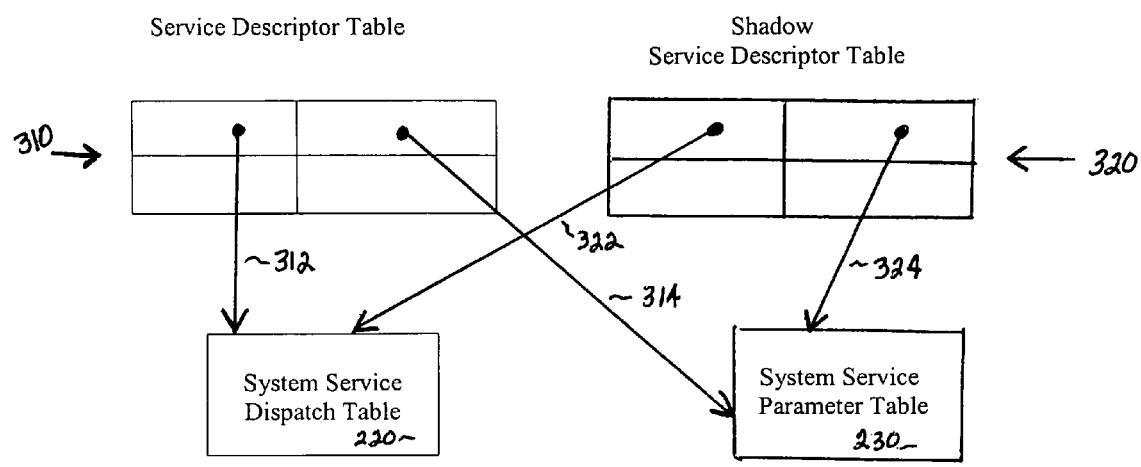
FIG. 5 System Service Tables

Locate Shadow Service Table    FIG. 6
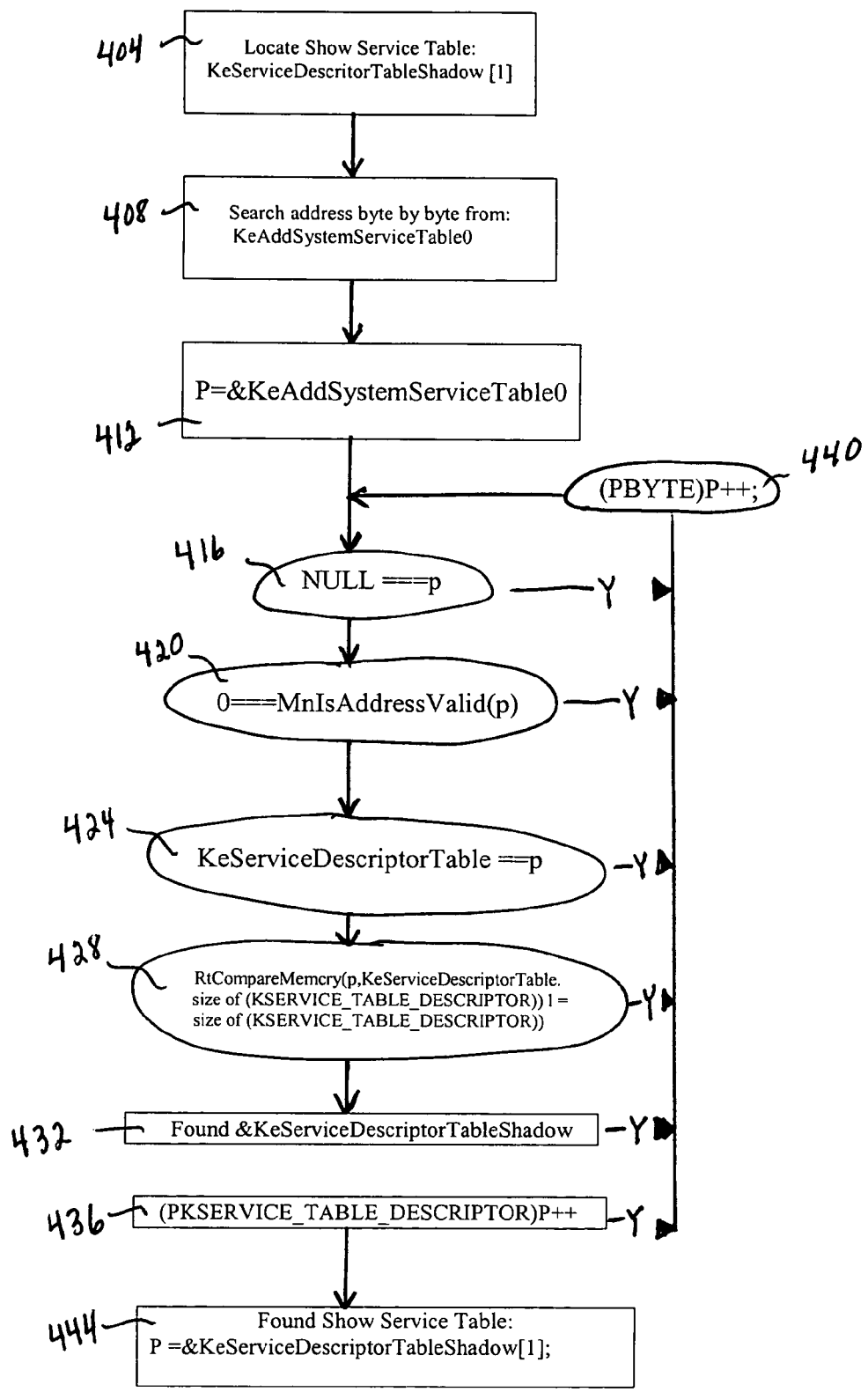

DETECTION OF KEY LOGGING SOFTWARE

FIELD OF THE INVENTION

The present invention relates generally to detection of particular software within a computer. More specifically, the present invention relates to detection of key logging software running on a computer.

BACKGROUND OF THE INVENTION

Computer users (whether at home or at the office) are concerned about their privacy while using their computer and also about the security of their computer. The recent proliferation of computer viruses and other malware has heightened this concern. One particular type of software is able to log the keystrokes and other actions taken by a computer user and is known as a key logging or keylogger software.

Keylogger software is surveillance software that is used to keep a record of user activities on the computer such as keystroke logging, screen actions logging, mouse movement logging and voice logging. The software is designed to work undetected by the user and has become so powerful that this type of software is a serious threat to the privacy and security of a computer. Keylogger software can be easy to find and install and is sometimes considered legitimate software in certain situations. For example, keylogger software can be easily acquired by browsing the Internet and downloading it for free or by purchasing it at a relatively low price. Use of keylogger software can be useful to system administrators in some organizations and even parents might find it beneficial. In general, though, surreptitious use of keylogger software is generally considered a threat to computer security.

Keylogger software is able to record and steal sensitive information such as passwords, user names, personal identification numbers and other sensitive information. Further, an unscrupulous hacker can find ways to hide running keylogger software from showing up in the task manager of a computer and keylogger software can be very difficult to detect or track once installed.

Current techniques do not provide an optimal solution to detecting keylogger software. For example, older detection technology is based upon pattern matching and will not be able to detect unknown keylogger software. Further, even some of the commercially-available keylogger software is treated unknowingly as a normal application (by detection software or by an administrator or user) even though it is used for malicious purposes. Numerous programs do exist for the detection of keylogger software but often do not detect the keylogger software. One reason is that keylogger software can work in many different ways and can hide itself. For example, some detection programs look for continuous file writing on a hard drive to determine the existence of keylogger software. This approach, though, is not suitable in situations where the keylogger software does not use the hard drive for logging files and instead uses FTP access or another technique. Further, these detection programs often have a very high rate of false positives and are therefore not useful to the end user or system administrator.

A technique is desired that would provide better detection of keylogger software. In particular, a technique is desired that would alert the user in real time when a computer program attempts to install keylogger software or when such software attempts to record events.

SUMMARY OF THE INVENTION

To achieve the foregoing, and in accordance with the purpose of the present invention, a technique is disclosed that detects installation, removal or execution of a hook procedure that is keylogger software.

In a first embodiment, a first step includes locating a shadow service table in the operating system. Second, inserting a detection hook function before a system service function that normally installs a hook procedure in the operating system. The detection hook function is accessed via said shadow service table. Next, a request to install a hook procedure via the system service function is intercepted by the detection hook function. The detection hook function determines whether the request indicates that the hook procedure is keylogger software. If so, an action is taken such as denying the request or alerting the user.

In a second embodiment, a method of installing a detection hook function to aid in the detection of keylogger software on a computer detects when a hook procedure is to be removed. First, locating a shadow service table in the operating system of said computer. Next, a detection hook function is inserted before a system service function that normally removes a hook procedure from the operating system. The detection hook function is accessed via said shadow service table. Any request to remove a hook procedure via the system service function is intercepted by the detection hook function. The detection hook function determines whether the request indicates that the hook procedure is keylogger software. If so, an action is taken such as denying the request, alerting the user, or making a record for later audit.

In a third embodiment, a method of installing a dynamic detection function to aid in the detection of keylogger software on a computer intercepts a call to a hook chain function. In a first step, a system call to a hook chain function in the operating system of the computer is located. The hook chain function normally passes a system event through a hook chain of the operating system. Next, a dynamic detection function is inserted before the hook chain function. The dynamic detection function is accessed via the system call. Next, a call to pass an event through the hook chain via the hook chain function is intercepted by the dynamic detection function. The dynamic detection function determines whether the call indicates that a hook procedure is keylogger software. If so, an action is taken.

BRIEF DESCRIPTION OF THE DRAWINGS

The invention, together with further advantages thereof, may best be understood by reference to the following description taken in conjunction with the accompanying drawings in which:

FIG. 1 lists types of hooks and how they are used.

FIG. 2 illustrates a simple representation of a hook chain and hook procedures.

FIG. 3 illustrates a process for invoking a system service.

FIG. 4 shows a dispatch table and a parameter table in kernel mode.

FIG. 5 illustrates the system service tables used to implement system services.

FIG. 6 illustrates a technique for locating a shadow service table.

DETAILED DESCRIPTION OF THE INVENTION

Figure 7:
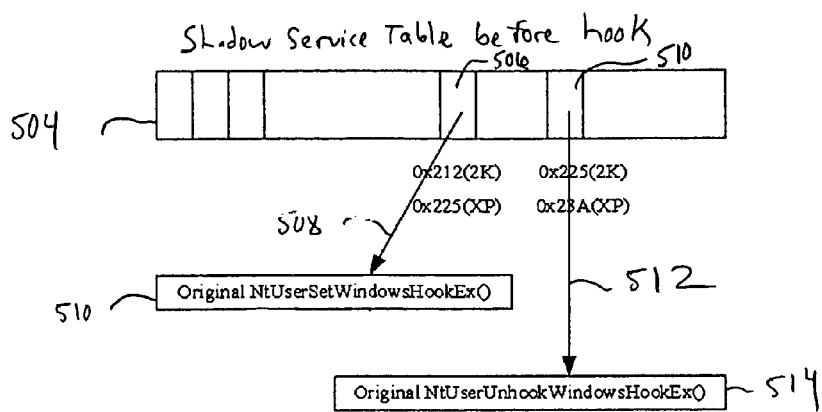
FIG. 7 illustrates a shadow service table before any detection hook functions are added to aid in the detection of keylogger software.

The present invention is applicable to malicious software commonly known as keylogger software that generally causes harm to a computer system, provides an effect that is not expected by the user, is undesirable, illegal, or otherwise causes the user to want to restore their computer system from a time prior to when it was infected by the software. The present invention provides a technique by which installation of keylogger software is detected in real time. The technique alerts the user as to which program has installed the keylogger software and when that occurred. By providing the user with this information the user can decide whether the keylogger software is a legitimate software application or should be removed.

Keylogger software is software that copies a computer user's keystrokes, screen selections, mouse clicks and movements, voice commands, or screen images (or any combination of these) to a file that it might send to a hacker at a later time. Keylogger software can record instant messages, e-mail messages and other information you type onto the keyboard. Many malicious keylogger programs record and steal passwords, user names, personal identification numbers, e-mail addresses, web site URLs and other sensitive information. This sensitive information is often sent to an unscrupulous party over a remote connection such as by e-mail, FTP, voice-over-IP, or other Internet connection. Often the keylogger software will awaken when a computer user connects to a secure web site such as a bank. It then logs the keystrokes, which might include account numbers, PINs and passwords, before they are encrypted by the secure web site. Keylogger software often operates quietly in the background and captures whatever the user types on the keyboard and saves that information into a hidden file. These hidden log files are hard to distinguish from operating system files and are sometimes encrypted. Because of their extremely small memory size and low use of the processor they are hard to detect. Keylogger software is often a component of a Trojan horse program Keylogger software does have some legitimate uses. It is often used as a diagnostic tool in software development where it is used to capture the user's keystrokes and can be useful to determine the sources of error and computer systems. Keylogger software is also used for law enforcement and espionage for obtaining passwords and encryption keys. The present invention is useful for detecting keylogger software whether it is for a malicious or legitimate use, and advantageously provides the user with an alert and information regarding the detection of the keylogger software and provides the user with the option of retaining or removing the keylogger software.

Keylogger Software Details

The present invention is particularly suited for detecting keylogger software on computers running an operating system from Microsoft Corporation; below are provided details on such an implementation.

Keylogger software may come in various forms. For example, keylogger software can be an executable file or can be a device driver that replaces the existing I/O driver with embedded key logging functionality. Keyloggers are commonly written in C or C++ using hooks available in the Microsoft operating system. A keylogger program typically includes two files, a DLL file (the hook procedure or filter function) and an executable file (an EXE file). The executable file loads the DLL file and implements the hook allowing the DLL file to perform the work of keystroke or event logging.

As is known in the art, a hook is a point in the system message handling mechanism where a software application can install a custom procedure to intercept message traffic before it reaches a target operating system procedure. In this fashion, a software application (such as keylogger software) can insert a custom hook procedure to intercept computer events (such as a keystroke or mouse event) before they reach the target operating system procedure. This hook procedure can act on events, modify or discard them. Such a hook procedure has powerful capabilities such as recording all keyboard and mouse events.

There are two categories of hooks, local and remote. Local hooks trap events occurring in a user's own process. Remote hooks trap events occurring in other processes and there are two types of these. Thread-specific remote hooks trap events that will occur in a specific thread in other processes. System-wide remote hooks trap all events destined for all threads in all processes in the computer system. System-wide hooks are used to develop keylogger software.

As mentioned above, keylogger software makes use of an executable file to load the actual hook procedure that is in the form of a DLL file. A DLL file is used because the computer system injects the code of the hook procedure into the address space of the target process and can only do so if the hook procedure is in the form of a DLL file. The hook procedure is called by the computer system whenever a particular event associated with the type of the hook installed occurs as explained below.

FIG. 1 lists 14 types of hooks and how they are used. For example, if a hook procedure is installed that is of the type "WH_KEYBOARD" then whenever a keyboard event occurs (such as a key press of a letter or number) then that installed hook procedure will be called. If an unscrupulous party has surreptitiously installed such a hook procedure it will automatically record all keyboard events, store them, and perhaps send them remotely to the unscrupulous party at a later time.

Hook procedures are installed in a Microsoft operating system using the function "SetWindowsHookEx" and are removed (uninstalled) by calling the function "UnhookWindowsHookEx." (The functions "SetWindowsHook" and "UnhookWindowsHook" had previously been used but are now obsolete.) A hook procedure is installed by calling the above function and providing one of the above 14 hook types, the address of the hook procedure contained in a DLL file, the instance handle of the DLL in which the hook procedure resides among and a thread identifier identifying a particular thread (null if the hook is a system-wide hook).

The Microsoft operating system stores information in memory about any installed hook procedures in a hook chain that is implemented as a linked list of existing hooks. Each installed hook is associated with a data structure in memory having information about the hook and a pointer to the actual hook procedure. Newly added hook procedures are added to the head of the list.

FIG. 2 illustrates a simple representation of a hook chain 100 and hook procedures. Hook chain 100 is a linked list of data structures 110-130, each data structure representing and including information about a particular hook procedure. For example, data structure 120 includes information about hook procedure B 160 and also includes a pointer 122 pointing to the actual hook procedure. Hook data structures 110 and 130 also include pointers 112 and 132 that point to the associated hook procedures 150 and 170, respectively.

Hook data structures keep important information about a hook procedure such as the type of hook, the hook procedure address and module information, mode of the hook, the thread and process context of the hook, and so on. The operating system will use this information to administer the hook procedures. Here is pseudo code describing this structure:

```
/*
 * Hook data structure.
 */
typedef struct tagHOOK
{       /* hk */
    THRDESKHEAD head;
    struct tagHOOK *phkNext;
    int iHook; // WH_xxx hook type
    PVOID offPfn;
    ULONG flags; // HF_xxx flags
    int ihmod;
    PVOID ptiHooked; // Thread hooked.
    PVOID rpdesk; // Global hook pdesk. Only used when
                  // hook is locked and owner is destroyed
}HOOK, *PHOOK;
```

As is known in the art, hook chain 100 is implemented in any suitable fashion as a linked list and the format of the pointers, the actual data structures and the hook procedures are also known to those of skill in the art.

When a message occurs that is associated with a particular type of hook the computer system passes the message to each hook procedure referenced in the hook chain, one after another. A hook procedure can monitor or modify a message passing through the hook chain, and can also prevents the message from reaching the next hook procedure or the target operating system procedure. In this fashion, a hook procedure installed by keylogger software can have deleterious effects.

Keylogger Software Detection

As mentioned above, the Microsoft operating system provides the capability to set global or thread-level hooks of a variety of types. Although the Microsoft operating system does not provide an application programming interface (API) to view or modify an existing hook chain of a running computer system, it is realized that there are internal operating system functions that allow access to an existing hook chain. Specifically, a technique is realized to identify a keylogger hook procedure before it is added to the existing hook chain.

As mentioned, the functions "SetWindowsHookEx" and "UnhookWindowsHookEx" are available to a computer programmer to install a hook procedure or to remove the hook procedure. But, at the user mode level, only these functions are visible and do not provide access to the existing hook chain. At the kernel level, though, it is realized that these two functions are mapped respectively to the system service functions "NtUserSetWindowsHookEx" and "NtUserUnhookWindowsHookEx." In other words, when the function "SetWindowsHookEx" is called at the user level then the service function "NtUserSetWindowsHookEx" is called at the kernel mode level.

FIG. 3 illustrates a process 200 for invoking a system service. A calling program 202 invokes a function and this call is mapped through DLLs 204 and 206 resulting in a call to the system layer 208 in kernel mode. The original call results in a call to an NT system service via NT executive 210. Implementation of a system service uses two tables.

FIG. 4 shows a dispatch table 220 and a parameter table 230 in kernel mode. During initialization a function table referred to as the system service dispatch table 220 is created. Each entry in the table contains the address 224 of the function to be executed for a given service identifier 222. The code for each function resides in the kernel. The system service parameter table 230 provides the number of parameter bytes 234 to expect from a particular service.

FIG. 5 illustrates the system service tables used to implement system services. System services are implemented by an NT 2Eh instruction referred to as a handler. The handler uses a first entry in service descriptor table 310 for service identifiers less than 0x1000 and refers to the second entry of the table for service identifiers greater than or equal to that number. If a service identifier is valid, the handler determines the addresses of the system service dispatch table 220 and the system service parameter table 230 using pointers 312 and 314. Another service descriptor table, shadow service descriptor table 320 matches service table 310 under operating system version 3.51. For example, entries in the shadow table 320 also point to the dispatch table and the parameter table via pointers 322 and 324. Under later versions of the operating system the second entry in shadow table 320 is not null, but points to another system service dispatch table and another system service parameter table.

The present invention realizes that these two system service functions, "NtUserSetWindowsHookEx" and "NtUserUnhookWindowsHookEx," can be hooked using the shadow service table. In other words, the present invention may insert its own detection hook function to intercept each of the calls to these two system service functions. It can be useful to also hook the "unhook" system service function. Because it is desirable to be able to provide a list of all currently installed hook procedures whenever the user requests such a list, it is useful to keep a real-time list of these procedures. When a hook procedure is removed, the present invention removes it from the list. Thus, hooking the uninstall hook system service function provides this information. In general, it is good practice to record the life cycle of a hook procedure.

Accordingly, details about when a suspected keylogger hook procedure was installed, who installed the hook and the installed hook type are made available. By viewing these details one can make an accurate determination that keylogger software has been installed. For example, if a hook procedure has been installed that is of the type "WH_KEYBOARD" and it is a system-wide hook, then the conclusion can be reached that this hook procedure is keylogger software.

Further, when the function "UnhookWindowsHookEx" is called at the user level then the service function "NtUserUnhookWindowsHookEx" is called at the kernel mode level. If a detection hook function is inserted before the service function then one is apprised that an existing hook procedure has been uninstalled. The custom code in the detection hook function will then execute immediately before the service function executes and can take any action necessary. For example, such a detection hook function might alert the user again or make a record for later behavior analysis or audit. Further, the removed hook procedure can be deleted from the current list of installed hook procedures.

FIG. 6 illustrates a technique for locating a shadow service table. Step 404 begins the process of locating the shadow service table and supplies a parameter. Steps 408-440 describe a technique for locating the shadow service table. Finally, step 444 concludes the process in which the location of the shadow service table is held in the parameter as shown.

FIG. 7 illustrates a shadow service table 504 before any detection hook functions are added to aid in the detection of keylogger software. Shadow service table 504 is a simplified, symbolic version of the shadow service table showing only a pointer 508 by which an entry in the shadow service table allows access to the original system service function "NtUserSetWindowsHookEx" 510, and a pointer 512 by which an entry in the shadow service table allows access to the original system service function "NtUserUnhookWindowsHookEx" 514. Pointers 508 and 512 originate at locations 506 and 510 in table 504. Once the location of the shadow service table has been determined, locations 506 and 510 may be determined. Thus, as shown, when an entity installs a hook procedure or removes a hook procedure under the Microsoft operating system the system service function 510 or 514 is called via pointers in the shadow service table.

Figure 8:
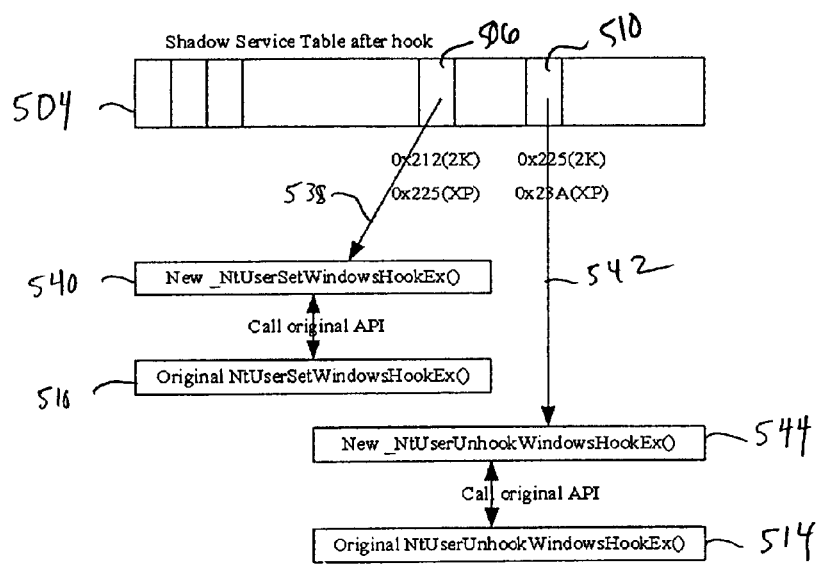
FIG. 8 illustrates the shadow service table after detection hook functions have been added to aid in the detection of keylogger software.

FIG. 8 illustrates the shadow service table 504 after detection hook functions have been added to aid in the detection of keylogger software. Advantageously, one may write their own detection hook function and insert that hook function before the actual call to the original service function. Shadow service table 504 is a simplified, symbolic version of the shadow service table showing only pointers 538 and 542 originating from the table. Once the shadow service table has been located, one may insert the previously written detection hook function before the actual call to the original service function. For example, one may write two new detection hook functions "New NtUserSetWindowsHookEx" 540 and "New NtUserUnhookWindowsHookEx" 544. Preferably, each of these two new functions each include a call to the original service function 510 or 514, respectively. Also, each of these two new functions include software code and functionality to determine whether a call to install a hook procedure from hook chain 100 or to remove a hook procedure might actually be attempting to install or remove keylogger software.

In one embodiment, the detection hook functions are added and are able to intercept the kernel functions by patching the shadow service table. Each kernel service has a pointer in the system service dispatch table that is indexed with the internal service number that the operating system assigns to the service function. If one replaces an entry in the table with a pointer to its own function then the kernel invokes the new function anytime an application attempts to execute the service function; thus the new function can control behavior of the service function.

As shown, a call to install a hook procedure using the pointer at location 506 is first intercepted by the new detection hook function 540. Similarly, a call to remove a hook procedure using the pointer at location 510 is first intercepted by the new detection hook function 544. Thus, as shown, when an entity installs a hook procedure or removes a hook procedure under the Microsoft operating system the system service functions 510 or 514 are not called unless code in functions 540 or 544 explicitly calls those original service functions. Preferably, as the invention attempts to detect keylogger software, code in functions 540 or 544 only attempt to determine if "keyboard" or "get message" type hooks are installed or removed. Also, it may be desirable to determine if a mouse type of hook is installed or removed. These types of hooks correspond respectively to the hook types: WH_KEYBOARD, WH_GETMESSAGE and WH_MOUSE.

The present invention can thus detect if keylogger software is attempting to install itself onto a user computer. Firstly, the shadow service table is located and the new functions 540 and 544 are installed. Alternatively, only one of these functions may be installed. Once any software on the user computer attempts to install a hook procedure or to remove a hook procedure it first must use the user level API and call the functions "SetWindowsHookEx" or "UnhookWindowsHookEx." These user level functions in turn call either system service function "NtUserSetWindowsHookEx" 510 or function "NtUserUnhookWindowsHookEx" 514. But, as these system service functions have had a new detection hook function inserted as shown in FIG. 8, this call is intercepted by either new function 540 or new function 544.

Thus, new function 540 (for example), can choose to allow or deny the software's hook procedure request. For example, the new detection function compares the requested new hook procedure with a particular pattern, monitors the present behavior of that software, or simply examines the type of request. For example, if the hook procedure is system wide and wants to monitor all keyboard actions, it may be determined that the software is keylogger software and the request may be denied. Thus, the present invention can prevent keylogger software from installing itself.

For example, the following pseudo code shows how to alert the user when a hook procedure is installed:

```
HHOOK New_xNtUserSetWindowsHookEx(HANDLE hmod,
PUNICODE New_pstrLib,
    ULONG idThread,int nFilterType, PROC pfnFilterProc,
ULONG dwFlags)
{
    HHOOK hHook = NULL;
    hHook = oNtUserSetWindowsHookEx(hmod, pstrLib,
        idThread,
nFilterType,
        pfnFilterProc, dwFlags);
    NotifyUser("System callled
NtUserSetWindowsHookEx(%X,%S,%X,%d,%X,%X),
return:%X",
    hmod, pstrLib->Buffer, idThread, nFilterType,
pfnFilterProc, dwFlags, hHook);
    if(NULL ! = hHook)
    {
        // Get the current process id, name or full path
        DrvGetCurrentAppID(&app);
        NotifyUser("The hook process successfully installed
by App(%d:%S)%S!",
            app.dwPID, app.wszPName, app.wszPImage);
    }
    return hHook;
}
```

When a hook procedure is installed, the present invention detects such installation from the detection hook function, and that new hook procedure is put in a list. When that hook procedure is removed, the present invention detects such removal via a detection hook function inserted before the unhook service function. Thus, that hook procedure can be removed from the list. The user may retrieve an accurate and up-to-date list of currently installed hook procedures installed in the system at any time.

Further, the present invention may also enable or disable keylogger software dynamically if it has already been installed. As shown previously in FIG. 2, a hook chain 100 exists internally under the Microsoft operating system. Each time an event triggers a type of hook, the system passes the event to each hook in the hook chain, one by one. The internal hook chain functions PhkFirstValid( ) and PhkNextValid( ) are used to pass the event through the hook chain 100. Similar to the above insertion of new functions, one may also write two new functions that take the place of hook chain functions PhkFirstValid( ) and PhkNextValid( ).

Figure 9:
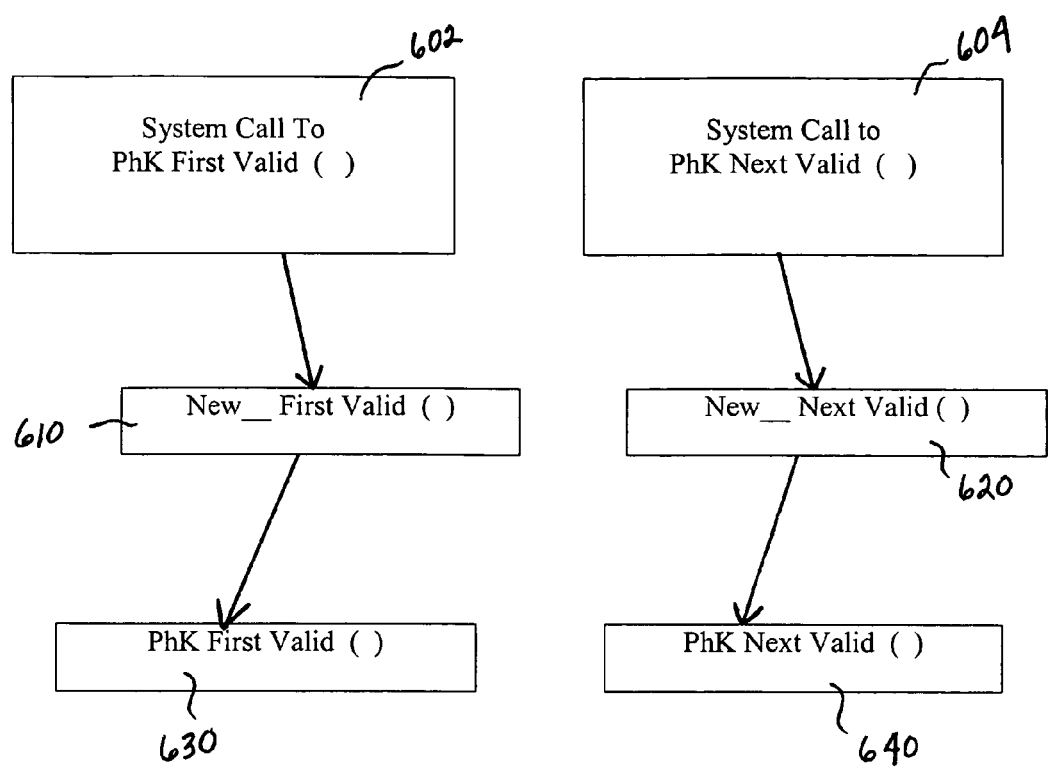
FIG. 9 illustrates two new dynamic detection functions that are inserted before the actual calls to the hook chain functions.

FIG. 9 illustrates two new dynamic detection functions that are inserted before the actual calls to the hook chain functions. Shown symbolically are internal system calls 602 and 604 to the functions PhkFirstValid( ) and PhkNextValid( ). By using a code patch one can hook these two functions and insert two new dynamic detection functions 610 and 620. These two new functions, New_FirstValid( ) 610 and New_NextValid( ) 620 include code and functionality as described above that can identify keylogger software.

Here is pseudo code for these two hook chain functions:
PHOOK PhkFirstValid(PTHREADINFO pti, int nFilterType);
PHOOK PhkNextValid(PHOOK phcur);

From each of these functions parameter list, they return a pointer to a HOOK structure. For PhkNextValid( ) it accepts a HOOK structure; from the hook structure data, the present invention is able to identify necessary information of a hook procedure.

But, once an event occurs, and before a hook procedure in the hook chain 100 is called, the internal functions PhkFirstValid( ) and PhkNextValid( ) will first be called. And because the two new functions 610 and 620 have been inserted before these internal functions, these two new functions can screen any attempts to execute a hook procedure that has been inserted by keylogger software. Thus, these two new functions can enable or disable keylogger software dynamically as it is attempting to log events in real time.

When the present invention shows (automatically or in response to a user request) a list of all currently installed hook procedures to the user, the user can choose to enable or disable any of the hook procedures as he or she prefers. After the user submits his request, the request is passed to the kernel level driver. An array is used to store an enable/disable list of hook procedures. When the request to enable or disable is received at the kernel level driver, the list in the array is updated with the user request. Each time the operating system calls PhkFirstValid( ) or PhkNextValid( ) one of the two new dynamic detection functions intercepts this call and then first searches the array. If the status in the array of a particular hook procedure is "disabled," then the dynamic detection function operates to bypass the call of the original process that would have executed the hook procedure. If the status in the array of a particular hook procedure is "enabled," then the dynamic detection function operates to pass the call the original hook procedure.

The following is pseudo code to demonstrate how these two hook chain functions may be implemented.

```
typedef PHOOK (*ProcPhkFirstValid) (PTHREADINFO pti, int
nFilterType);
PHOOK xPhkFirstValid(PTHREADINFO pti, int nFilterType)
{
    PHOOK ph;
    ph = _oPhkFirstValid(pti, nFilterType);
    if (ENABLE == SearchStatusFrom(Array, ph))
    {
        //Pass ph to PhkNextValid( )
        return ph;
    }
    else
    {
        //Skip current, pass next hook to PhkNextValid( )
        ph = ph->phkNext;
        return ph;
    }
}
typedef PHOOK (*ProcPhkNextValid) (PHOOK phcur) ;
PHOOK xPhkNextValid(PHOOK phcur)
{
    ProcPhkNextValid pfnNext = 0;
    if (ENABLE == SearchStatusFrom(Array, phcur))
    {
        //Pass ph to original PhkNextValid( )
        pfnNext = (ProcPhkNext)&PhkXXXValid2K[1] ;
        return pfnNext;
    }
    else
```

```
    {
        //Skip current, do not call current hook's procedure,
        //pass next hook to PhkNextValid( )
        pfnNext = phcur ->phkNext;
        return ph;
    }
}
```

Thus, any attempt by keylogger software that has been installed as a hook procedure to log or send events may be intercepted in real time and either be enabled or disabled.

Computer System Embodiment

Figure 10:
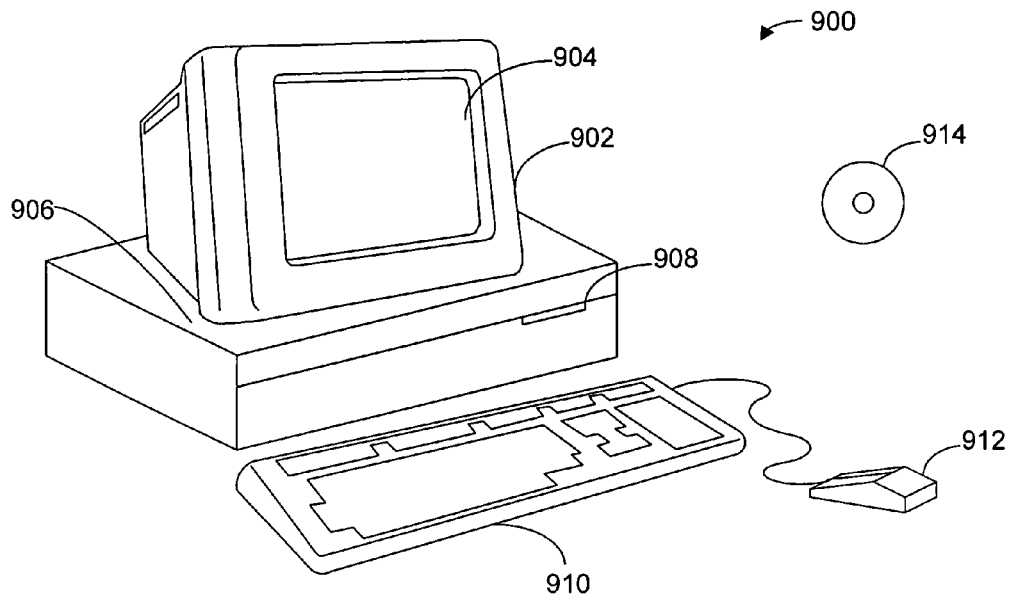
FIGS. 10A and 10B illustrate a computer system suitable for implementing embodiments of the present invention.
Figure 10:
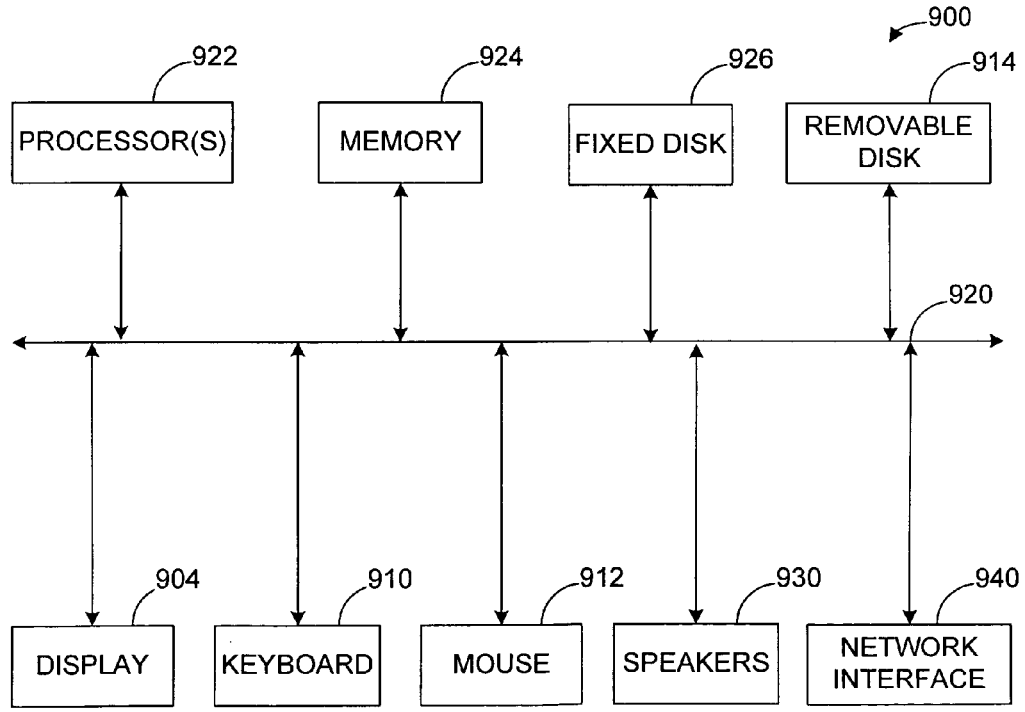

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of installing a detection hook function to aid in the detection of keylogger software on a computer, said method comprising:
   locating a shadow service table in the operating system of said computer;
   inserting a detection hook function before a system service function that normally installs a hook procedure in said operating system, said detection hook function being accessed via said shadow service table;
   intercepting a request to install a hook procedure via said system service function, said intercepting performed by said detection hook function;
   determining, by said detection hook function, whether said request indicates that said hook procedure is keylogger software; and
   taking an action when it is determined that said hook procedure is keylogger software.

2. A method as recited in claim 1 wherein said action includes
   generating an alert to a user of said computer indicating that said request to install said hook procedure has been intercepted and that said hook procedure is keylogger software.

3. A method as recited in claim 1 wherein said action includes
   denying said request to install said hook procedure via said system service function, whereby said hook procedure is not installed.

4. A method as recited in claim 2 further comprising:
   receiving input from said user indicating that said request to install said hook procedure must be denied; and
   denying said request to install said hook procedure via said system service function, whereby said hook procedure is not installed.

5. A method as recited in claim 1 further comprising:
   providing information to a user of said computer, said information including the type of said hook procedure.

6. A method as recited in claim 1 wherein said operating system is a Microsoft operating system.

7. A method as recited in claim 1 further comprising:
   determining whether said request indicates that said hook procedure is keylogger software based upon a type of said requested a hook procedure.

8. A method of installing a detection hook function to aid in the detection of keylogger software on a computer, said method comprising:
   locating a shadow service table in the operating system of said computer;
   inserting a detection hook function before a system service function that normally removes a hook procedure from said operating system, said detection hook function being accessed via said shadow service table;
   intercepting a request to remove a hook procedure via said system service function, said intercepting performed by said detection hook function; and
   taking an action regarding said request to remove said hook procedure.

9. A method as recited in claim 8 wherein said action includes
   allowing said hook procedure to be removed; and
   generating an alert to a user of said computer indicating that said request to remove said hook procedure has been intercepted and that said hook procedure has been removed.

10. A method as recited in claim 8 wherein said action includes
    updating a list that keeps track of installed hook procedures, whereby said hook procedure is removed from said list.

11. A method as recited in claim 9 further comprising:
    determining whether said hook procedure is keylogger software, said determining being performed by said detection hook function; and
    alerting a user that said hook procedure is keylogger software.

12. A method as recited in claim 8 further comprising:
    providing information to a user of said computer, said information including the type of said hook procedure.

13. A method as recited in claim 8 wherein said operating system is a Microsoft operating system.

14. A method as recited in claim 8 further comprising:
    determining whether said request indicates that said hook procedure is keylogger software based upon a type of said requested a hook procedure.

15. A method of installing a dynamic detection function to aid in the detection of keylogger software on a computer, said method comprising:
    locating a system call to a hook chain function in the operating system of said computer, said hook chain function normally passing a system event through a hook chain of said operating system;
    inserting a dynamic detection function before said hook chain function, said dynamic detection function being accessed via said system call;
    intercepting a call to pass an event through said hook chain via said hook chain function, said intercepting performed by said dynamic detection function;
    determining, by said dynamic detection function, whether said call indicates that a hook procedure is keylogger software;
    alerting a user when it is determined that said hook procedure is keylogger software;
    receiving input from said user indicating that said call to pass said event through said hook chain must be denied; and
    denying said call to pass said event through said hook chain, whereby said hook procedure is not executed.

16. A method as recited in claim 15 further comprising:
    providing information to a user of said computer, said information including the type of said hook procedure.

17. A method as recited in claim 15 wherein said hook chain function is PhkFirstValid( ) or is PhkNextValid( ).

* * * * *

UNITED STATES PATENT AND TRADEMARK OFFICE
CERTIFICATE OF CORRECTION

| | | |
|---|---|---|
| PATENT NO. | : 7,823,201 B1 | Page 1 of 1 |
| APPLICATION NO. | : 11/394791 | |
| DATED | : October 26, 2010 | |
| INVENTOR(S) | : Yeli Xu | |

It is certified that error appears in the above-identified patent and that said Letters Patent is hereby corrected as shown below:

Title Page, Item (75)

Inventor:

Change "Yelie" to -- Yeli --.

Signed and Sealed this
Twenty-sixth Day of April, 2011

David J. Kappos
*Director of the United States Patent and Trademark Office*